Figures 1, 2, 3, 4, 5:
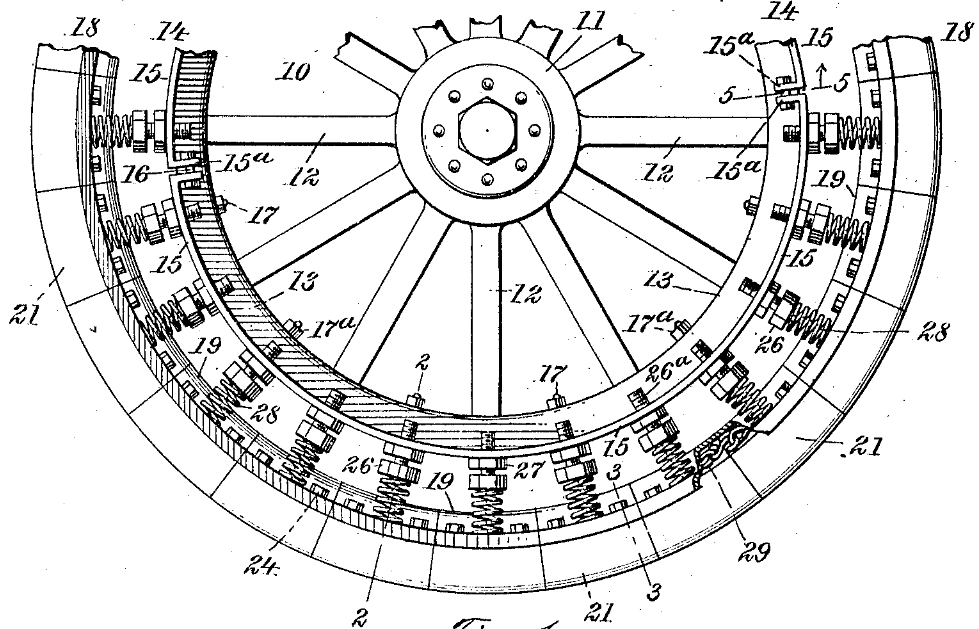

C. J. OHLSSON.
VEHICLE WHEEL.
APPLICATION FILED JULY 8, 1911.

1,053,636. Patented Feb. 18, 1913.

Witnesses:
Julius H. Lutz
Edwin H. Dietrich

Inventor
CHARLES J. OHLSSON
BY Conrad A. Dieterich
his ATTORNEY.

UNITED STATES PATENT OFFICE.

CHARLES J. OHLSSON, OF NEW YORK, N. Y.

VEHICLE-WHEEL.

1,053,636. Specification of Letters Patent. Patented Feb. 18, 1913.

Application filed July 8, 1911. Serial No. 637,450.

*To all whom it may concern:*

Be it known that I, CHARLES J. OHLSSON, of the city of New York, borough of Brooklyn, Kings county, in the State of New York, have invented certain new and useful Improvements in Vehicle-Wheels, of which the following is a full, clear, and exact specification.

My invention relates to improvements in vehicle tires and the same has for its object more particularly to provide a simple, efficient and reliable tire composed of a plurality of sections which may be readily assembled and secured in position upon a wheel rim.

Further, said invention has for its object to provide a resilient tire for wheels which tire is composed of a plurality of sections each of which is independently adjustable.

Further, said invention has for its object to provide a tire for wheels which is so constructed and arranged that the outer or tread portion may be readily adjusted in order to make the same concentric with the wheel rim.

Further, said invention has for its object to provide a tire for vehicle wheels, composed of a plurality of sections conforming to each other and arranged concentrically with the wheel rim, and maintained yieldingly in position thereon, and all of said sections secured in place by means of a single, flexible member embracing all of said tread sections.

Further, said invention has for its object to provide a yielding or resilient tire in which the degree of resiliency may be readily adjusted to suit the particular conditions under which the vehicle wheel is to be used.

To the attainment of the foregoing objects and ends, my invention consists in the novel details of construction, and in the combination, connection and arrangement of parts, hereinafter more fully described and then pointed out in the claims.

In the accompanying drawings forming part of this specification, wherein like numerals of reference indicate like parts, Figure 1 is a side view partly broken away, showing a portion of a wheel constructed according to, and embodying, my said invention; Fig. 2 is an enlarged transverse section taken on the line 2—2 of Fig. 1; Fig. 3 is an enlarged transverse section taken on the line 3—3 of Fig. 1, showing one of the supports and a tire section secured in position thereon; Fig. 4 is an enlarged detail plan view showing one of the tire sections and the support therefor, and Fig. 5 is an enlarged detail section taken on the line 5—5 of Fig. 1 illustrating one end of one of the semicircular plates upon which the spring sockets are mounted.

In said drawings 10 designates a wheel comprising a hub 11, spokes 12, and rim 13. Upon the outer side of the rim 13 is mounted an annular plate 14 composed of two semicircular sections 15, 15, each of which is broader than the rim 13. The opposing ends of the plate sections 15, 15 are provided with inwardly extending ears or lugs $15^a$, $15^a$, which are located at opposite sides of the rim 13, and secured together by bolts and nuts 16. At intervals said plate sections are further secured to the rim 13 by bolts 17 and nuts $17^a$.

18 denotes an annular member of larger diameter than the wheel rim 13, which surrounds the same. The said annular member 18 is composed of a series of independent or separate tire supports each of which consists of a segmental plate 19 having depending flanges or rims $19^a$, $19^a$ along its longitudinal edges, and a central, longitudinal recess 20 in its outer side whose ends register with the ends of similar recesses provided in the adjoining segmental plates 19, 19 in order that the same shall jointly form an annular groove.

Within each support or segmental plate 19 is secured a resilient tire section 21, which is preferably made of rubber, and has embedded therein a plurality of bolts 22, 22 having comparatively large heads 23, 23 thereon in order to secure said bolts more firmly within said tire sections. Each segmental plate 19 is provided with apertures to receive the threaded ends of said bolts 22, 22, which are provided with nuts 24, 24 for securing said tire sections 21 in position. Each segmental plate 19 is further provided adjacent to its longitudinal edges with studs 25, 25.

26, 26 denote socket members having polygonal heads and threaded stems 26ª, 26ª, adapted to be fitted into threaded apertures provided in the laterally projecting edges of the semi-circular plate sections 15, 15. The threaded stems 26ª, 26ª are provided with lock nuts 27, 27 whereby said socket members may be readily secured to their adjusted positions.

28, 28 denote coil springs which serve to maintain the outer annular member 18 yieldingly in position surrounding the wheel rim, but free therefrom. The said springs 28, 28 have their inner ends located within the adjustable socket members 26, 26, and their outer ends embracing the studs 25, 25 arranged upon the segmental plates 19, 19.

The tire sections are maintained duly in position, in end to end relation, and surrounding the wheel rim 13 by means of a chain 29 or other suitable device, which by preference should be flexible. The said chain has its ends secured together, and disposed within the annular grooves formed by the longitudinal recesses 20, 20 provided in the segmental plate 19, 19.

To assemble the tire, the semi-circular plates 15, 15 with the socket member 26, 26 thereon are first secured to the wheel rim 13. Hereupon the segmental plates 19, 19, with their springs 28, 28, are adjusted, and the parts then secured together by means of the chain or flexible securing member 29. After this has been done, the tire sections 21, 21 are bolted in place upon their respective segmental plates 19, 19. Hereupon the outer annular member 18 is trued up, or made concentric with the wheel rim 13 by adjusting the socket members 26, 26 as required. When the required adjustment has been obtained the socket members are secured to their adjusted positions by means of the lock nuts 27, 27.

It is to be noted that by means of my invention, I am enabled to produce a resilient tire which may be applied to a wheel rim, and in which the degree of resiliency may be conveniently controlled by adjusting the socket members 26, 26 and thereby varying the tension of the springs 28, 28, as desired.

Having thus described my invention what I claim and desire to secure by Letters Patent, is:

1. A vehicle wheel having a rim, a plate composed of two semi-circular sections, each broader than said rim and secured thereto, socket members arranged upon said plate sections, an annular member of greater diameter than said wheel rim, comprising a series of separate supports, retaining members arranged upon said supports, springs having their ends located within the socket members on said plate sections, and the retaining members on said supports, tire sections mounted upon said supports, and an annular flexible member composed of a series of similarly-shaped elements embracing said supports for maintaining the same in position surrounding said rim, substantially as specified.

2. A vehicle wheel having a rim, a plate composed of two semi-circular sections, each broader than said rim and secured thereto, socket members arranged upon said plate sections, means for adjusting said socket members, means for securing the same in their adjusted positions, an annular member of greater diameter than said wheel rim, comprising a series of separate supports, retaining members arranged upon said supports, springs having their ends located within the socket members on said plate sections, and the retaining members on said supports, tire sections mounted upon said supports, and an annular flexible member composed of a series of loosely connected link members arranged intermediate said supports and said tire sections for maintaining the same in position surrounding said rim, substantially as specified.

3. A vehicle wheel having a rim, a plate composed of two semi-circular sections each broader than said rim means for securing said plate sections in position upon said rim, socket members adjustably mounted adjacent to the edges of said plate section at both sides of said rim, means for securing said socket members in their adjusted positions upon said plate sections, an annular member of greater diameter than said rim comprising a series of separate supports arranged in end to end relation, and each having a longitudinal recess arranged therein projections on said supports, springs having their ends disposed within the socket members on said plate sections, and the projections on said supports, tire sections secured to said supports, and a flexible annular retaining member composed of a series of similarly-shaped link members located within the recessed portion of said supports, for maintaining the same in position and surrounding said rim, substantially as specified.

4. A vehicle wheel having a rim, a plate composed of two semi-circular sections each broader than said rim, means for securing said plate sections to said socket members, threaded stems on said socket members extending through the laterally projecting edges of said plate sections, lock nuts arranged upon said threaded stems, an annular member surrounding said rim comprising a series of supports arranged in end to end relation, and each having a longitudinal recess in its inner side registering with the longitudinal recesses in the adjoining supports, studs arranged upon said supports registering with the socket members on said plate sections, coil springs having their ends disposed within said socket members and upon said studs, tire sections secured to said supports, and a chain having its ends secured together and located within the annular recesses formed by the recesses arranged in said supports, substantially as specified.

Signed at the city of New York, in the county and State of New York, this third day of July, nineteen hundred and eleven.

CHARLES J. OHLSSON.

Witnesses:

CONRAD A. DIETERICH,
LEON A. CARLEY.

Copies of this patent may be obtained for five cents each, by addressing the "Commissioner of Patents, Washington, D. C."